United States Patent
Ozaki et al.

(10) Patent No.: US 7,137,273 B2
(45) Date of Patent: Nov. 21, 2006

(54) AIR CHILLER UNIT

(75) Inventors: Masaji Ozaki, Tokyo (JP); Tsuyoshi Oguri, Tokyo (JP)

(73) Assignee: Jamco Corporation, Tokyo (JP)

( * ) Notice: Subject to any disclaimer, the term of this patent is extended or adjusted under 35 U.S.C. 154(b) by 100 days.

(21) Appl. No.: 10/995,482

(22) Filed: Nov. 24, 2004

(65) Prior Publication Data

US 2005/0115269 A1    Jun. 2, 2005

(30) Foreign Application Priority Data

Dec. 1, 2003    (JP) .............................. 2003-401778

(51) Int. Cl.
F25B 43/02    (2006.01)
(52) U.S. Cl. ........................................... 62/470; 62/85
(58) Field of Classification Search .................. 62/469, 62/470, 85, 476; 418/69; 417/310, 319
See application file for complete search history.

(56) References Cited

U.S. PATENT DOCUMENTS

| | | | | |
|---|---|---|---|---|
| 4,545,742 A | * | 10/1985 | Schaefer | 417/366 |
| 4,715,800 A | * | 12/1987 | Nishizawa et al. | 418/69 |
| 5,222,874 A | * | 6/1993 | Unnewehr et al. | 417/372 |
| 5,491,979 A | | 2/1996 | Kull et al. | |
| 5,605,047 A | * | 2/1997 | Park et al. | 62/3.6 |
| 2003/0042361 A1 | * | 3/2003 | Simadiris et al. | 244/118.5 |

* cited by examiner

*Primary Examiner*—Melvin Jones
(74) *Attorney, Agent, or Firm*—Westerman, Hattori, Daniels & Adrian, LLP.

(57) ABSTRACT

The invention provides an improved air chiller unit mounted on an aircraft for sending cooled air to service carts used for serving meals. A compressor 20 of a refrigerant equipped in an air chiller unit has a motor 210 and a rotary compressor 220 disposed in a cylindrical housing 200. An oil separator unit 240 attached to the top portion of a drive shaft 214 of the motor has two disks 241 and 242 which define two labyrinth portions $G_1$ and $G_2$ for effectively separating lubricating oil from the refrigerant traveling toward a refrigerant exit 203.

2 Claims, 8 Drawing Sheets

AIR CHILLER UNIT

The present application is based on and claims priority of Japanese patent application No. 2003-401778 filed on Dec. 1, 2003, the entire contents of which are hereby incorporated by reference.

BACKGROUND OF THE INVENTION

1. Field of the Invention

The present invention relates to an air chiller unit (air cooling device) equipped within a body of an aircraft, for supplying cooled air to foods or the like.

2. Description of the Related Art

Passenger aircrafts that travel long distances, such as international flights, are equipped with service carts storing meals etc. to be served to passengers, and galleys (kitchen areas) storing the service carts for preparing beverages and carrying out easy food preparation.

The meals are cooked in advance in service facilities on the ground, placed on trays to be stored in service carts, and brought on board.

Of the meals placed on the trays, warm dishes are heated by a heater etc., and cold dishes such as salads are maintained at low temperature by cooled air fed into the service carts.

Patent document 1, U.S. Pat. No. 5,491,979, discloses an example of a device for cooling service carts.

The air chiller unit is disposed in a space provided on the ceiling or under the floor of the galley in the aircraft. The air chiller unit is equipped with a refrigeration cycle unit, cooling air by an evaporator disposed with in a cooling air chamber and supplying the cooled air via a duct to the galley or the like.

Since the air chiller unit is equipped in an aircraft, the unit is required to be light weight and small sized, and since it is located near the passenger seats, the noise generated by the unit must be reduced.

SUMMARY OF THE INVENTION

The object of the present invention is to provide an air chiller unit that satisfies the above demands.

The air chiller unit according to the present invention comprises a compressor for a refrigerant constituting a refrigeration cycle unit, and the compressor is equipped with an oil separator unit having a cylindrical housing, a motor disposed in the housing, a rotary compressor driven by the motor, and two disks attached to a drive shaft of the motor.

Further, the oil separator unit is equipped with a fixture member having a tapered portion being press fit to a top portion of the drive shaft of the motor, or the oil separator unit has a third disk disposed above the two disks and close to a top portion of the drive shaft of the motor.

As described, the present air chiller unit improves the functions for separating lubricating oil disposed within a compressor for a refrigerant constituting the refrigeration cycle unit of the air chiller unit. Along with the improvement in the performance of the oil separator unit, the size of the housing of the compressor in the axial direction can be reduced, which leads to reducing the size and weight of the air chiller unit equipped in the aircraft.

DETAILED DESCRIPTION OF THE PREFERRED EMBODIMENTS

Figure 1:
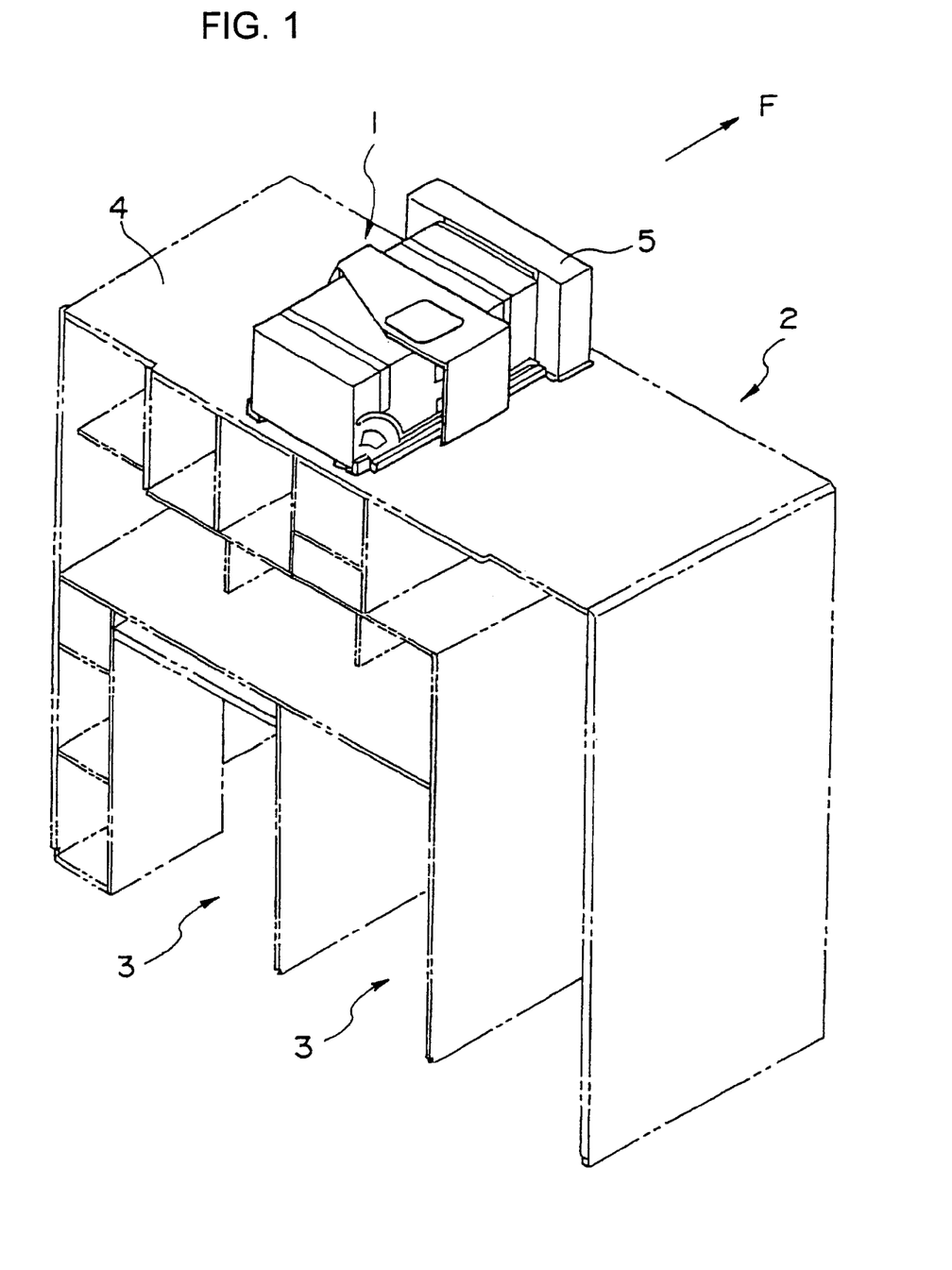
FIG. 1 is an explanatory view showing the general structure of the galley.

FIG. 1 is an explanatory view showing the general structure of a galley equipped with an air chiller unit according to the present invention.

The galley denoted as a whole by reference number 2 is formed of panel members, and equipped with multiple shelves and storages for storing cooking devices and the like.

Storage spaces 3 provided on the floor of the galley 2 are for storing service carts (not shown) storing trays for meals.

Above a ceiling 4 of the galley 2 is attached an air chiller unit 1. The air chiller unit 1 is not exposed to the cabin, but disposed within the ceiling of the aircraft.

Arrow F of FIG. 1 indicates the forward direction of the air craft body, and a passage for cooled air for cooling the service carts is formed on the back side of the galley 2 positioned at the forward direction of the aircraft body.

The cool air circulated within the galley is recycled to the air chiller unit 1, where it is cooled to predetermined temperature and then sent out into the galley again.

A duct device 5 connected to the air chiller unit 1 is equipped with a passage returning from the interior of the galley and a passage for sending freshly cooled air toward the galley.

Figure 2:
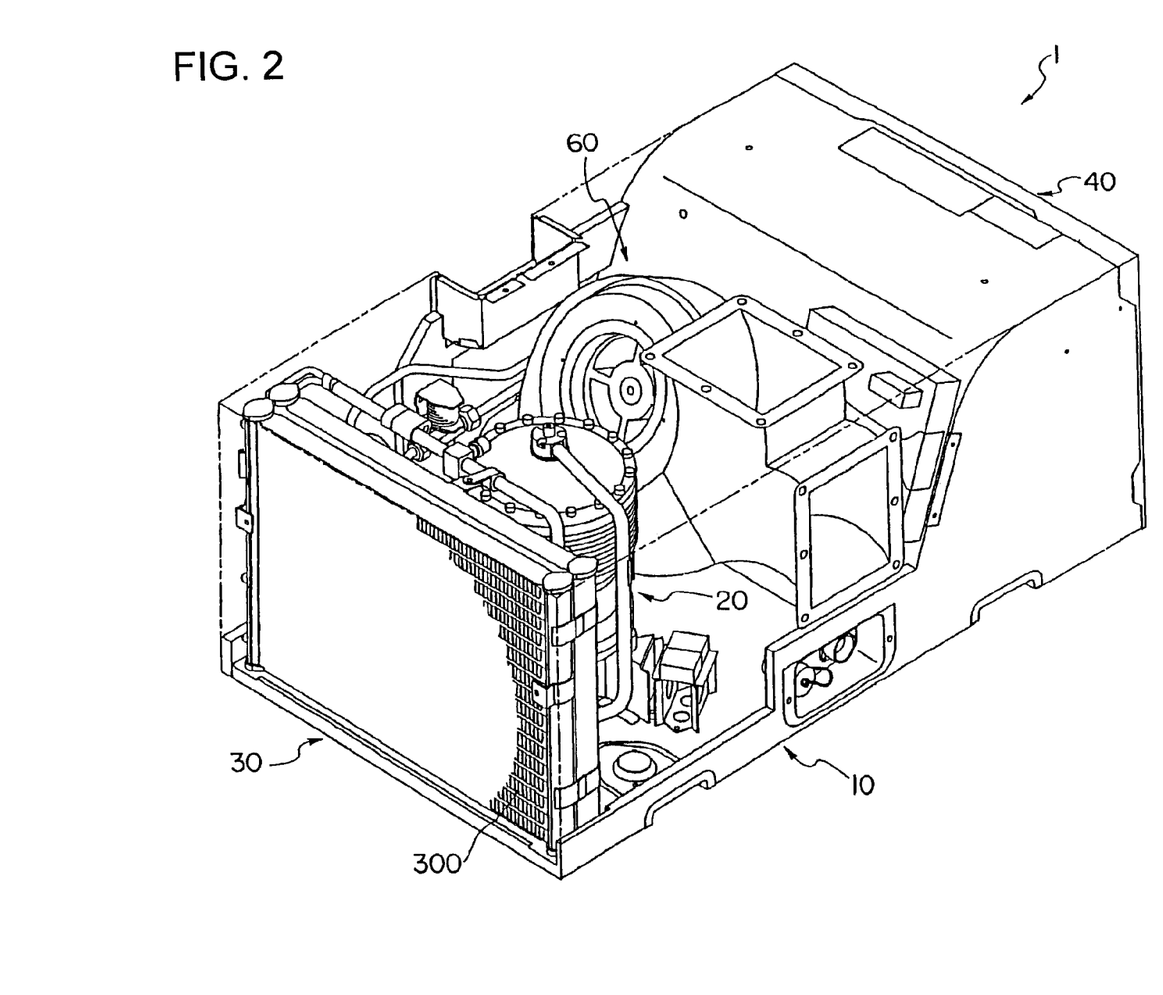
FIG. 2 is an explanatory view of an air chiller unit according to the present invention.
Figure 3:
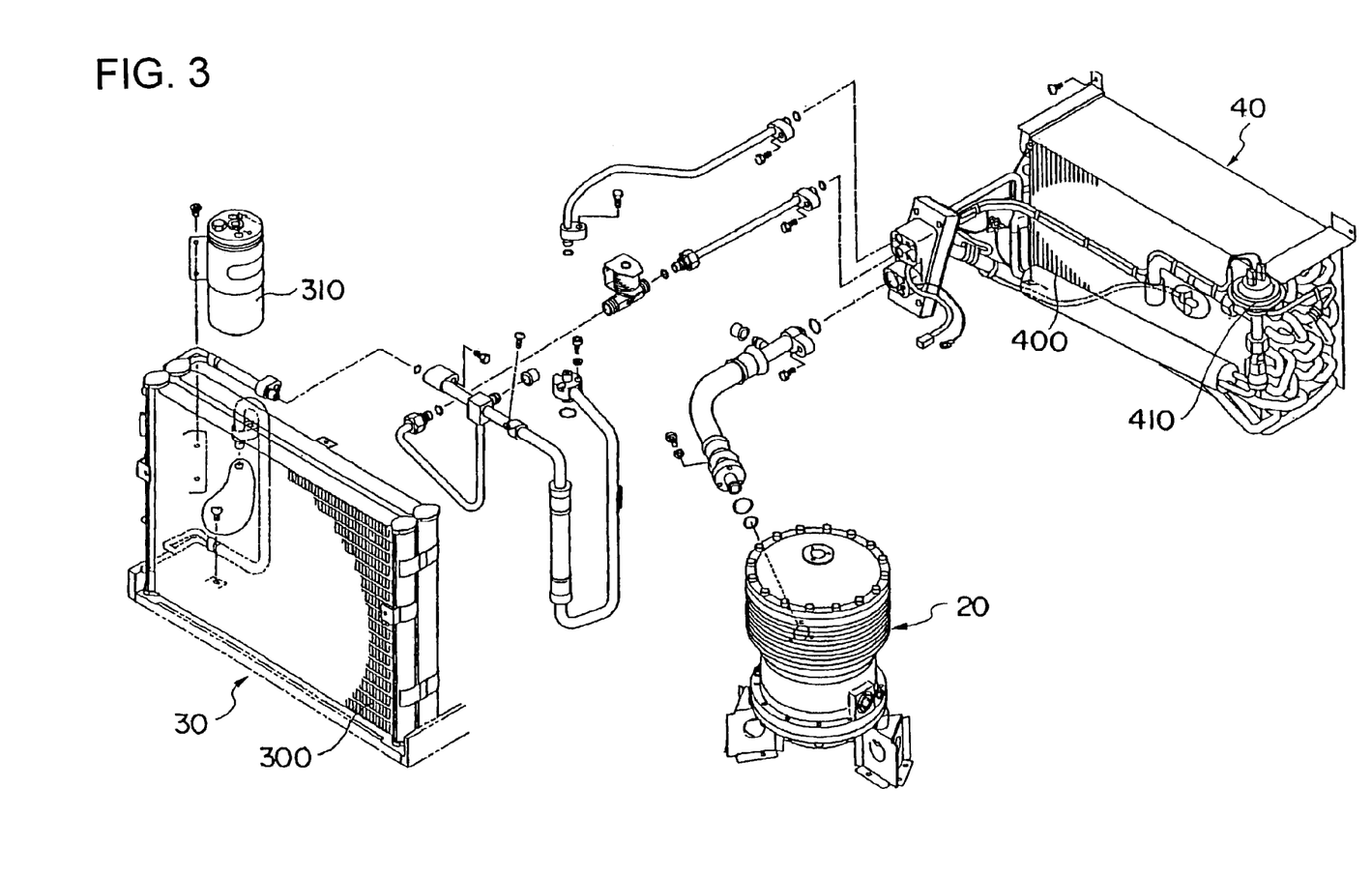
FIG. 3 is an explanatory view of a refrigeration cycle unit of the air chiller unit according to the present invention.

FIGS. 2 and 3 are explanatory views showing the exterior of the air chiller unit according to the present invention and the general structure of the refrigeration cycle unit.

An air chiller unit referred to as a whole by reference number 1 is equipped with a casing 10, a compressor 20 for a refrigerant disposed within the casing 10, a condenser 30, an evaporator 40 and a blower device 60 for blowing air.

As illustrated in FIG. 3, the refrigeration cycle unit of the air chiller unit is equipped with a compressor 20 driven by a motor, for compressing the refrigerant and sending out the same toward the condenser 30. The condenser 30 is equipped with a heat exchanger 300 for exchanging the gaseous refrigerant to a liquid-phase refrigerant. The liquid-phase refrigerant is stored in a receiver drier 310 disposed adjacent to the heat exchanger. The liquid-phase refrigerant in the receiver drier 310 is sent via a piping to an evaporator 40 disposed within the air cooling chamber defined by the wall of the casing 10. The liquid-phase refrigerant travels through an expansion valve 410 equipped to the evaporator 40 and sent to a heat exchanger 400 of the evaporator. The refrigerant is evaporated in the heat exchanger 400 and cools the air passing the heat exchanger 400.

The expansion valve 410 changes the opening of the valve according to the pressure and temperature of the refrigerant returning toward the compressor 20 from the evaporator 40, to thereby control the flow rate of the refrigerant being sent to the evaporator.

The blower device 60 has two fans mounted on both ends of a shaft of a motor, and blows air toward the condenser 30 and also blows the cooled air generated in the air cooling chamber toward the service carts placed in the galley of the passenger cabin.

Figure 4:
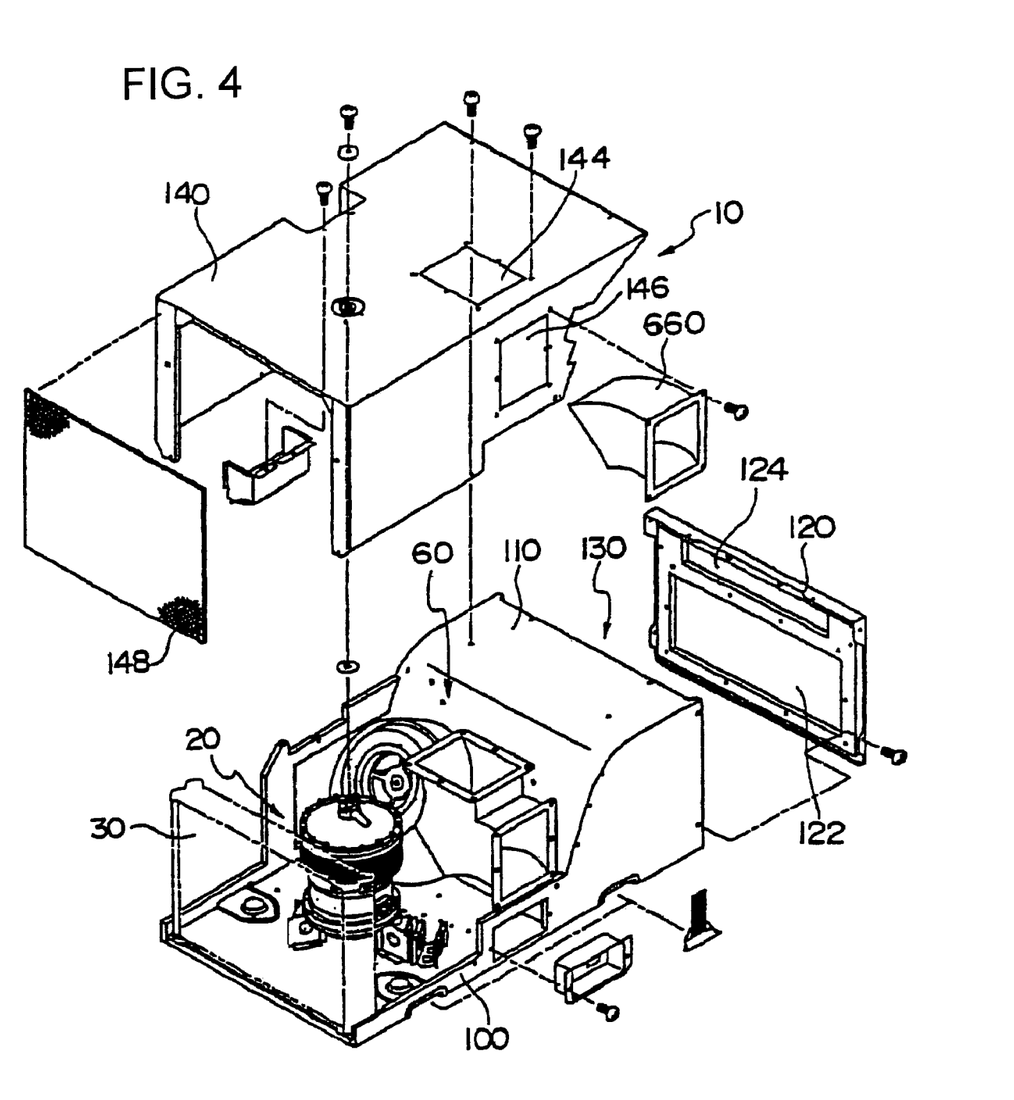
FIG. 4 is an explanatory view showing the structure of a casing of the air chiller unit according to the present invention.
Figure 5:
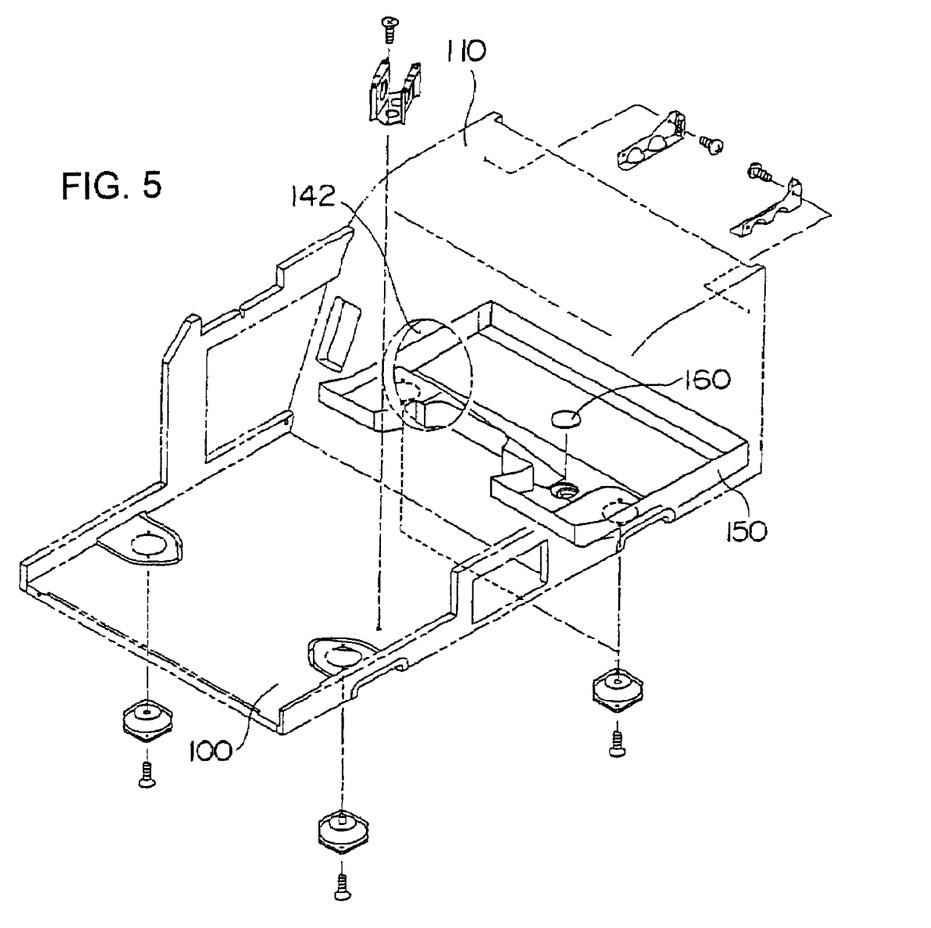
FIG. 5 is an explanatory view showing the structure of a casing of the air chiller unit according to the present invention.

FIGS. 4 and 5 are explanatory views showing the structure of a casing of the air chiller unit according to the present invention.

The casing 10 comprises a base plate 100, and on the base plate 100 are mounted devices such as the compressor 20.

The base plate 100 is formed of a honeycomb panel manufactured by sandwiching a core member having a honeycomb structure between two parallel plate members.

The honeycomb panel is light weight and has superior flexural rigidity, so the base plate 100 is capable of supporting devices such as the compressor 20 by itself.

Since the honeycomb panel is formed to have air sealed in the honeycomb core, it has high heat insulating property. Therefore, it is suitable for forming the air cooling chamber or the like.

A partition member 110 formed of a honeycomb panel is disposed on the base plate 100. This partition member 110 is for dividing the air chiller unit into a side having the condenser and a side having the evaporator, and on this partition member 110 is mounted the blower device 60.

The partition member constitutes a portion of the air cooling chamber 130. A lid member 120 is mounted on the opening of the partition member 110.

The lid member 120 connected to a duct device 5 is equipped with a first opening 122 and a second opening 124. The first opening 122 is connected to a passage for sending the cool air returning from the galley to the air cooling chamber 130, and the second opening 124 is connected to a passage for sending the freshly cooled air cooled in the air cooling chamber 130 toward the galley.

A cover member 140 is mounted above the base plate 100, by which the compressor 20 and the blower device 60 are covered. The cover member 140 has rectangular openings 144 and 146 on the upper surface and side surface thereof. The openings 144 and 146 are used as exhaust outlets of air having cooled the condenser 30 and the compressor 20.

A mesh member 148 is attached to the end of the cover member 140, by which the front face of the condenser 30 is covered.

As illustrated in FIG. 5, a round hole 142 for the blower device is provided to the partition member 110. Further, a drain pan 150 for receiving water drops condensed on the evaporator is attached to the bottom of the air cooling chamber. The drain pan 150 is equipped with a drain valve 160.

Figure 6:
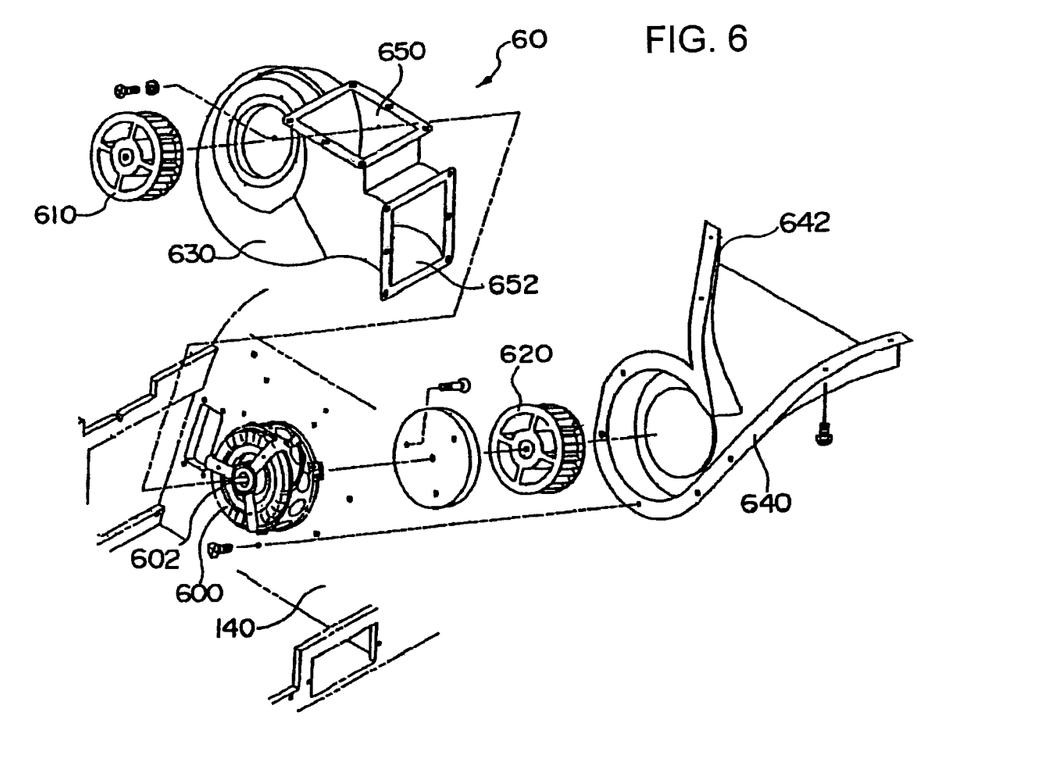
FIG. 6 is an explanatory view of a blower device of the air chiller unit according to the present invention.

FIG. 6 is an explanatory view showing the structure of the blower device 60.

The blower device 60 has a housing 630 constituting a passage for sending out cooled air, and a motor 600 disposed within the housing 630. The motor 600 has a drive shaft 602 whose both ends protrude therefrom, and on both ends of the driving shaft are fixed a first fan 610 and a second fan 620.

The first fan 610 is for sending the air for cooling the side having the condenser 30. The second fan 620 is for blowing the air cooled in the air cooling chamber toward the galley. The opening of the housing 630 is covered with a cover 640.

An opening portion 642 of the cover 640 is connected to a second opening 124 of the lid member 120 for sending the freshly cooled air toward the galley.

Figure 7:
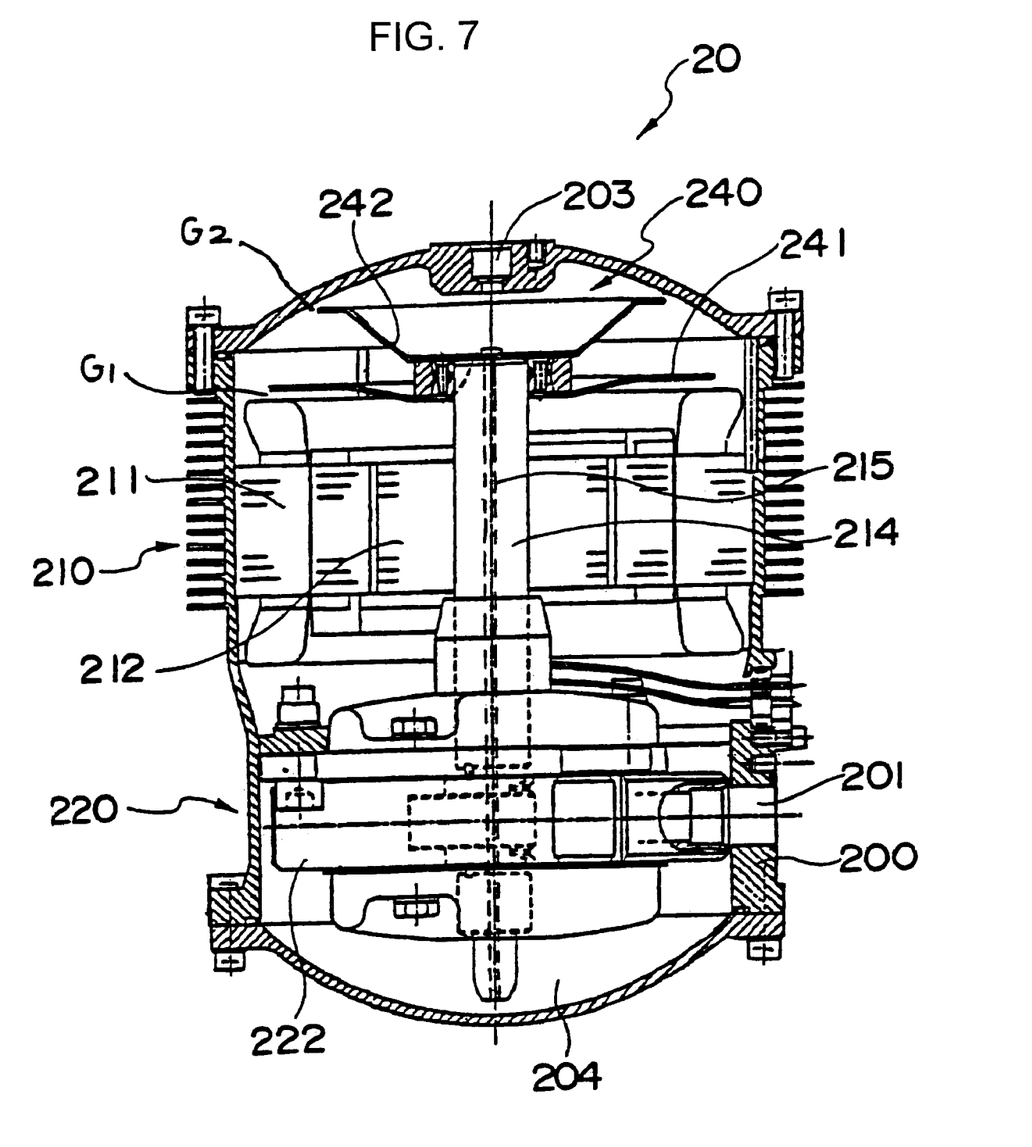
FIG. 7 is an explanatory view of a blower device of the air chiller unit according to the present invention.
Figure 8:
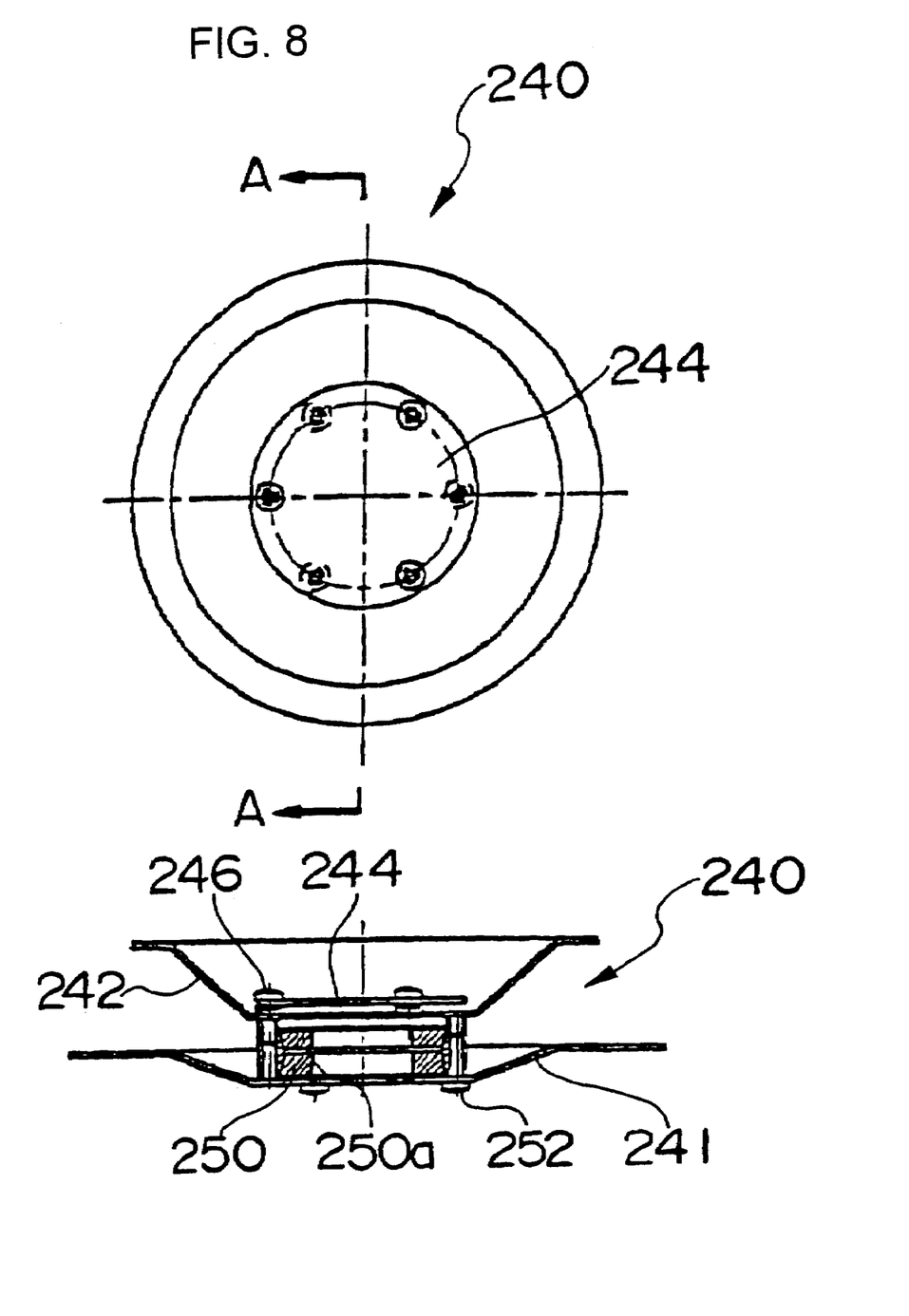
FIG. 8 is an explanatory view of an oil separator unit.

FIG. 7 is a cross-sectional view showing the structure of the compressor 20, and FIG. 8 is an explanatory view of an oil separator unit.

The compressor 20 has a cylindrical housing 200, and in the housing 200 is disposed a motor 210 and a rotary compressor 220.

The motor 210 is equipped with a stator 211 and a rotor 212, and at the center of the rotor 212 is disposed a drive shaft 214. The drive shaft 214 of the motor drives a compressor pump 222 to pressurize the refrigerant sent into the compressor through a refrigerant entrance port 201 provided to the housing 200, and sends out the refrigerant through an output port provided at the top of the housing toward the condenser.

In order to lubricate the rotary portions of the rotary compressor 220, a lubricating oil is supplied to a bottom portion 204 of the housing 200. The lubricating oil tends to mix with the compressed refrigerant and flow out through the output port toward the condenser.

Therefore, an oil separator unit 240 is provided to separate the lubricating oil from the refrigerant and return the lubricating oil back into the bottom portion 204 of the housing.

The oil separator unit 240 according to the present invention is structured by having two disks 241 and 242, one disk disposed on top of the other, attached to a top portion of the drive shaft 214 of the motor.

The two disks rotate together with the drive shaft, creating a two-tiered labyrinth structure by gaps $G_1$ and $G_2$ formed between the outer circumferences of the disks and the inner wall of the housing. While passing through this two-tiered labyrinth structure, the lubricating oil is separated from the refrigerant and returned to the bottom of the housing.

FIG. 8 is an explanatory view showing the details of the oil separator unit 240.

Two disks 241 and 242 have at the inner diameter area thereof a fixture member 250, and are assembled integrally via a screw 252. The fixture member 250 has its inner diameter area formed into a tapered portion 250a that is tapered toward the upper direction. This tapered portion is used to attach the oil separator unit 240 to the top of the drive shaft 214 using frictional force.

A fine bore is formed to the center of the drive shaft 214 to allow cooling gas and lubricating oil to pass therethrough. Therefore, it is not possible to adopt a structure to attach the oil separator unit 240 to the drive shaft 214 using a screw or a nut, and thus, the above-described fixing structure is adopted.

As explained, the oil separator unit according to the present invention adopts a structure in which two disks are layered, and the unit is attached to the top of the motor using a fixture member having a tapered portion. Therefore, the present oil separator unit realizes effective oil separation with a short axial direction length.

According to the embodiment illustrated in FIG. 8, a third disk 244 is further disposed on top of the upper disk 242.

The third disk 244 is attached via a screw 246 on top of the upper disk 242 with a gap formed therebetween.

The disk 244 is disposed to have a gap formed between the top portion of the drive shaft 214, preventing the refrigerant gas and the lubricating oil discharged from the lubricating oil passage 215 from directly reaching exit 203.

What is claimed is:

1. An air chiller unit equipped in an aircraft for supplying cooled air to a storage portion for storing food and the like, the air chiller unit comprising a compressor for a refrigerant constituting a refrigeration cycle unit, the compressor equipped with an oil separator unit comprising:

a cylindrical housing;
a motor disposed in the housing;
a rotary compressor driven by the motor; and two disks attached to a drive shaft of the motor;

wherein the oil separator unit is equipped with a fixture member having a tapered portion being press fit to a top portion of the drive shaft of the motor.

2. An air chiller unit equipped in an aircraft for supplying cooled air to a storage portion for storing food and the like, the air chiller unit comprising a compressor for a refrigerant constituting a refrigeration cycle unit, the compressor equipped with an oil separator unit comprising:

a cylindrical housing;

a motor disposed in the housing;

a rotary compressor driven by the motor; and two disks attached to a drive shaft of the motor;

wherein the oil separator unit has a third disk disposed above the two disks and close to a top portion of the drive shaft of the motor.

* * * * *